US 9,800,148 B2

(12) United States Patent
Gritti et al.

(10) Patent No.: US 9,800,148 B2
(45) Date of Patent: Oct. 24, 2017

(54) CONTROL MODULE WITH AN ESTIMATOR OF AN INPUT ELECTRIC QUANTITY FOR A SWITCHING CONVERTER AND METHOD FOR CONTROLLING A SWITCHING CONVERTER

(71) Applicant: STMICROELECTRONICS S.R.L., Agrate Brianza (IT)

(72) Inventors: Giovanni Gritti, Bergamo (IT); Claudio Adragna, Monza (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 35 days.

(21) Appl. No.: 14/957,329

(22) Filed: Dec. 2, 2015

(65) Prior Publication Data

US 2016/0248323 A1    Aug. 25, 2016

(30) Foreign Application Priority Data

Feb. 25, 2015   (IT) ............... TO2015A0134

(51) Int. Cl.
*G05F 1/00* (2006.01)
*H05B 37/02* (2006.01)
*H05B 39/04* (2006.01)
*H05B 41/36* (2006.01)
*H02M 3/157* (2006.01)
(Continued)

(52) U.S. Cl.
CPC ......... *H02M 3/157* (2013.01); *H02M 1/4225* (2013.01); *H02M 1/4258* (2013.01); *H05B 37/0209* (2013.01); *H02M 2001/0025* (2013.01); *H02M 2001/0048* (2013.01); *H02M 2001/0058* (2013.01); *H02M 2001/0064* (2013.01); *Y02B 70/126* (2013.01); *Y02B 70/1491* (2013.01)

(58) Field of Classification Search
None
See application file for complete search history.

(56) References Cited

U.S. PATENT DOCUMENTS

| 6,356,466 | B1* | 3/2002 | Smidt ............... | H02M 3/33507 323/222 |
| 2010/0148737 | A1* | 6/2010 | Li ..................... | H02M 3/1588 323/282 |
| 2010/0270984 | A1 | 10/2010 | Park et al. | |

(Continued)

OTHER PUBLICATIONS

STMicroelectronics, Application Note (AN1059), "Design Equations of High-Power-Factor Flyback Converters Based on the L6561," 20 pages, Sep. 2003.

(Continued)

*Primary Examiner* — Anh Tran
(74) *Attorney, Agent, or Firm* — Seed IP Law Group LLP

(57) ABSTRACT

Described herein is a module for controlling a switching converter, which includes at least one inductor element and one switch element and generates an output electric quantity starting from an input electric quantity. The control module generates a command signal for controlling the switching of the switch element and includes an estimator stage, which generates an estimation signal proportional to the input electric quantity, on the basis of the command signal and of an input signal indicating a time interval in which the inductor element is demagnetized. The control module generates the command signal on the basis of the estimation signal.

30 Claims, 12 Drawing Sheets

(51) Int. Cl.
*H02M 1/42* (2007.01)
*H02M 1/00* (2006.01)

(56) References Cited

U.S. PATENT DOCUMENTS

2012/0243277 A1     9/2012  Odell
2013/0057173 A1*    3/2013  Yao .................... H05B 33/0815
                                                           315/206

OTHER PUBLICATIONS

European Commission Joint Research Centre—Institute for Energy and Transport, Renewable Energy Unit, "Code of Conduct on Energy Efficiency of External Power Supplies," Version 5, 6 pages, Oct. 29, 2013.
U.S. Department of Energy—Appliance and Equipment Standards, External Power Supplies, https://wwwl.eere.energy.gov/buildings/appliance_standards/product.aspx?productid=23, accessed Nov. 17, 2015, 4 pages.

* cited by examiner

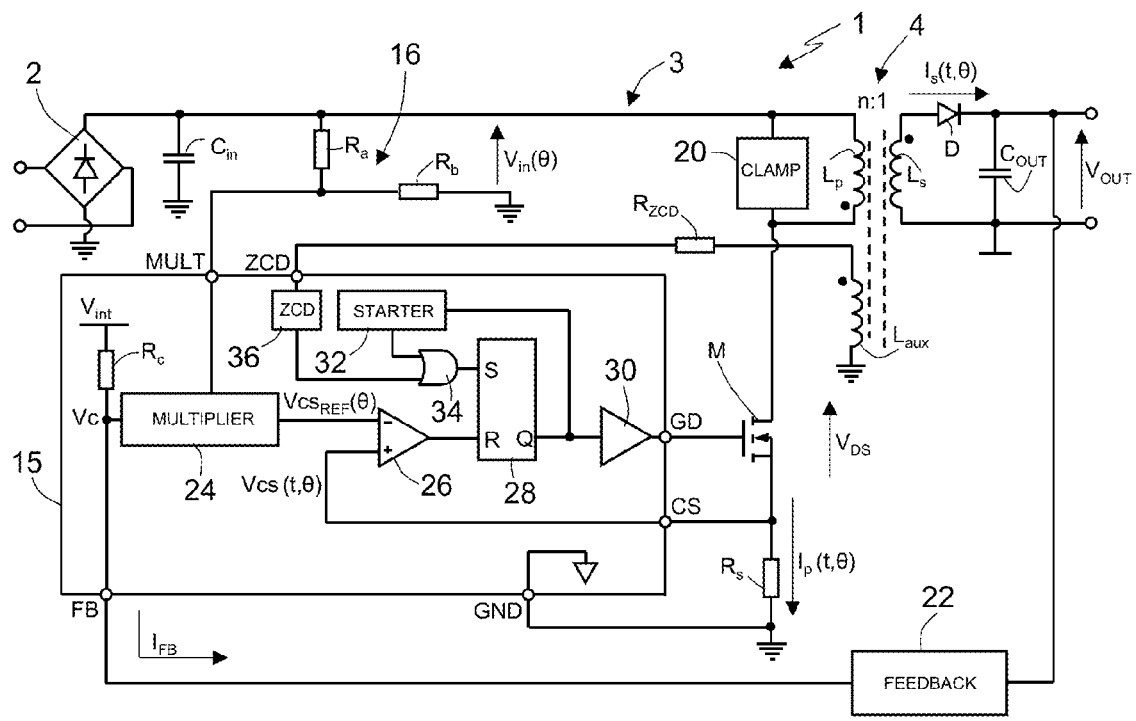
Fig.1 *(Prior Art)*
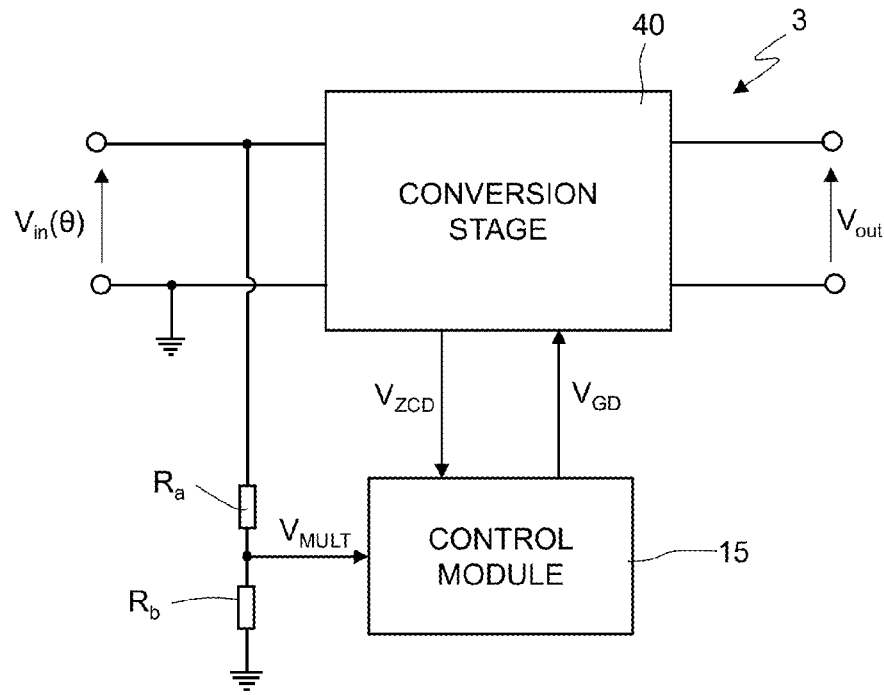
Fig.4 *(Prior Art)*

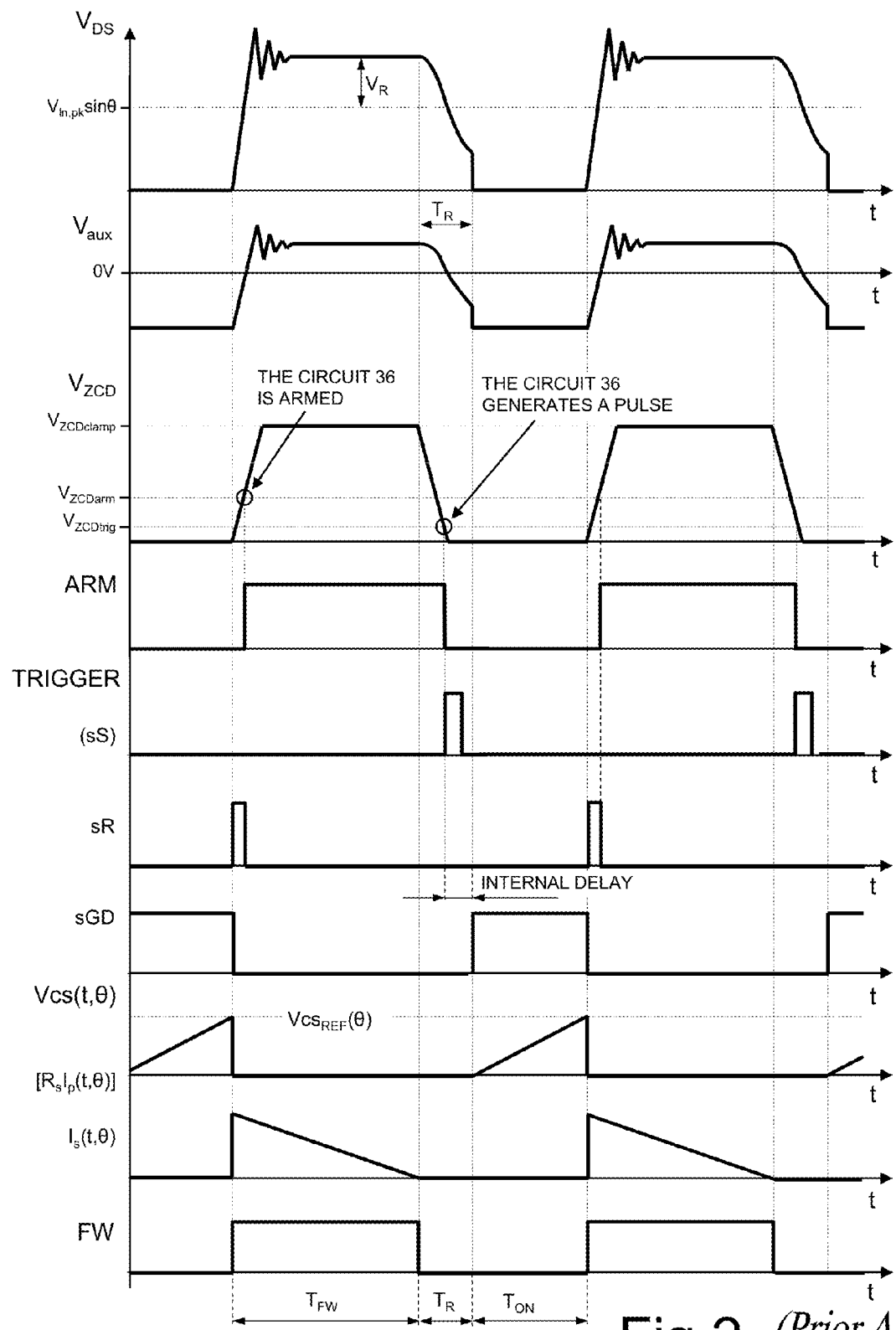
Fig.2 *(Prior Art)*

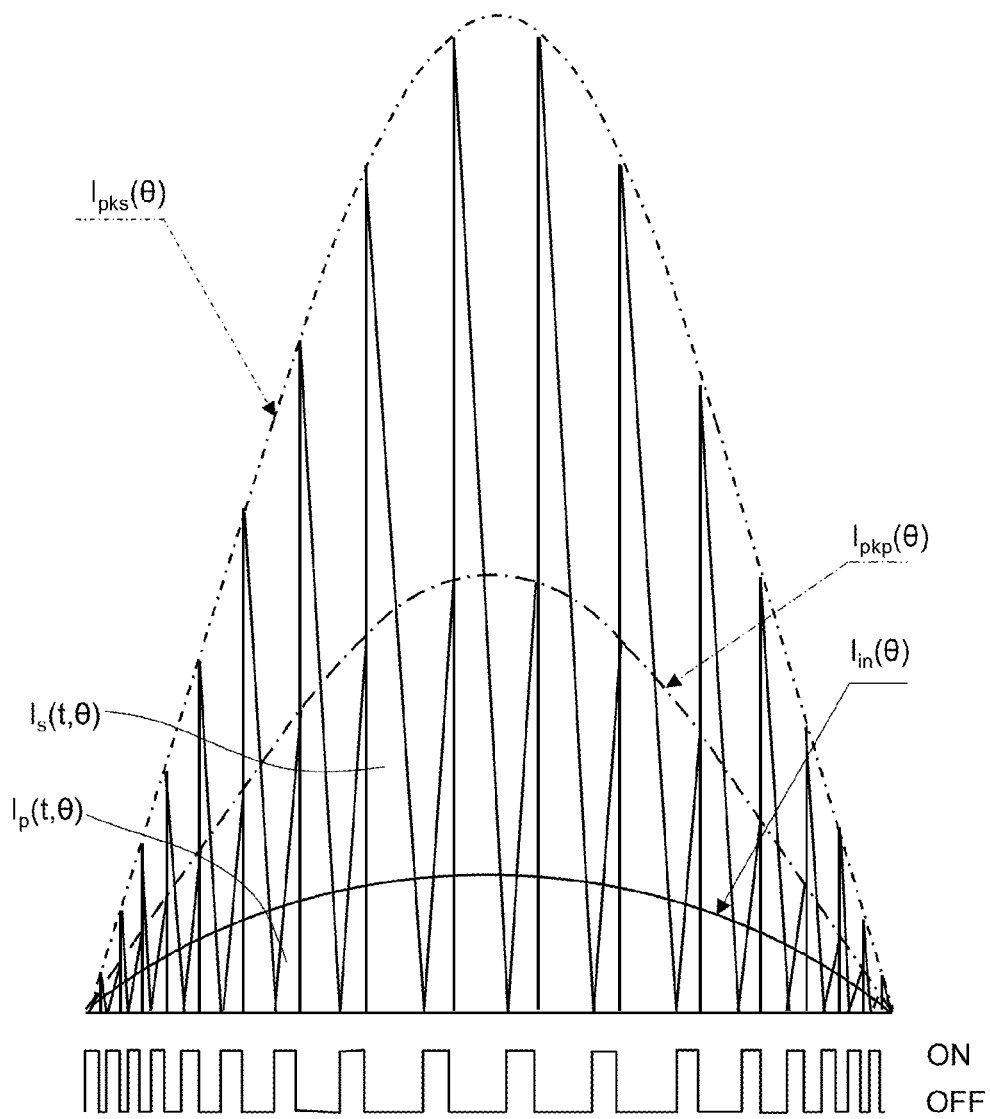
Fig.3 *(Prior Art)*
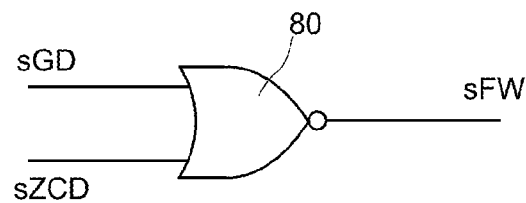
Fig.8

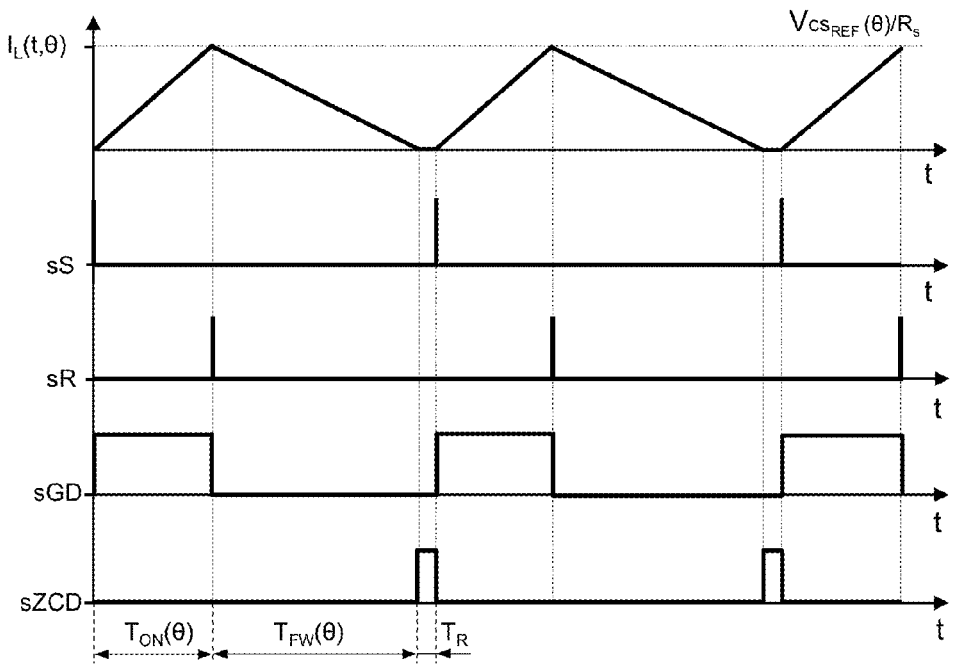
Fig. 6A *(Prior Art)*
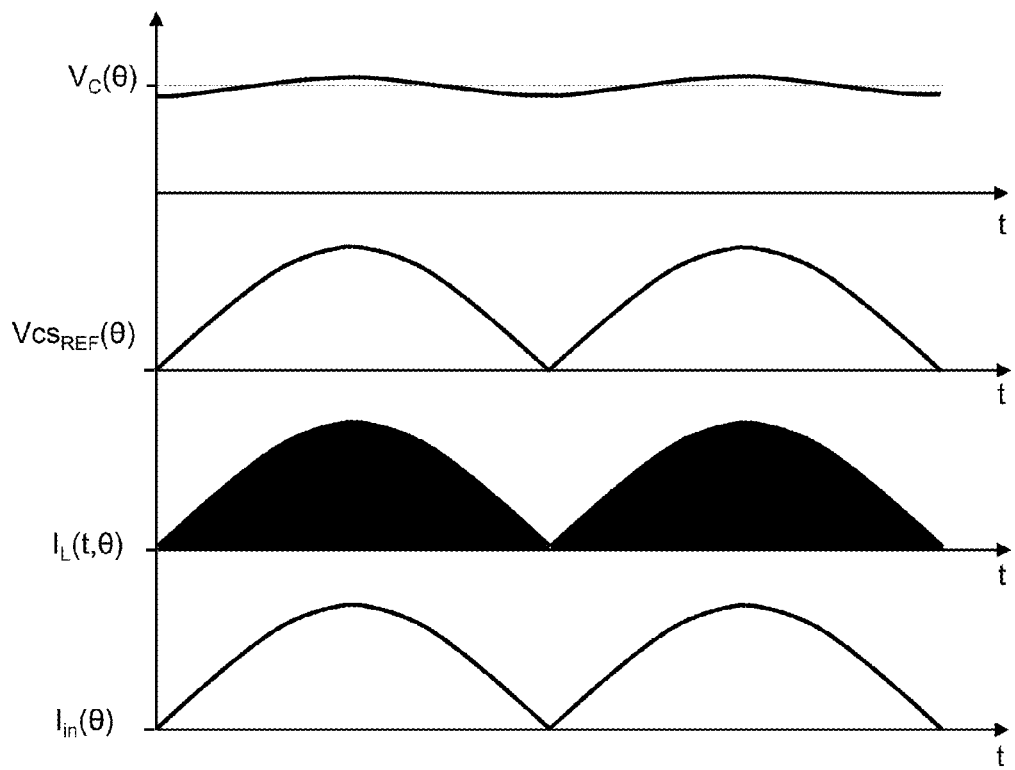
Fig. 6B *(Prior Art)*

CONTROL MODULE WITH AN ESTIMATOR OF AN INPUT ELECTRIC QUANTITY FOR A SWITCHING CONVERTER AND METHOD FOR CONTROLLING A SWITCHING CONVERTER

BACKGROUND

Technical Field

The present disclosure relates to a control module for a switching converter, which includes an estimator of an input electric quantity. In addition, the present disclosure relates to a method for controlling a switching converter.

Description of the Related Art

As is known, there exist various types of switching converters, amongst which there may, for example, be cited flyback, boost, and buck converters.

In general, in the field of switching converters there is particularly felt the need to have available converters that are characterized by a high power factor, as well as a low total harmonic distortion (THD) and a low zero-load power dissipation. In order to obtain the aforementioned characteristics, switching converters are known that implement, for example, a circuit layout of the type illustrated in FIG. 1.

In detail, FIG. 1 shows a switching power supply 1 of a flyback type, referred to hereinafter as "flyback power supply 1".

In greater detail, the flyback power supply 1 includes a bridge rectifier 2, which has two input terminals, designed to receive an a.c. voltage from a supply line, and a first output terminal and a second output terminal, which are connected, respectively, to a first ground and to a first terminal of a filtering capacitor $C_{in}$, the second terminal of which is connected to the first ground. The bridge rectifier 2 supplies on its own second output terminal a voltage $V_{in}(\theta)$, referred to hereinafter as "input voltage $V_{in}(\theta)$", where $\theta$ is the phase of the a.c. voltage present on the supply line.

The flyback power supply 1 further comprises a flyback converter 3, which on the primary side includes, in addition to the filtering capacitor $C_{in}$, a transformer 4, which comprises a first inductor $L_p$ and a second inductor $L_s$, which function respectively as primary winding $L_p$ and secondary winding $L_s$ and share a same magnetic core, referred to hereinafter as "core of the transformer 4". Furthermore, the transformer 4 comprises an auxiliary winding $L_{aux}$. A first terminal of the primary winding $L_p$ is connected to the first terminal of the filtering capacitor $C_{in}$.

The flyback converter 3 further comprises a control module 15, a resistive divider 16, which includes a first resistor $R_a$ and a second resistor $R_b$, and a transistor M formed, for example, by a power MOSFET.

The first resistor $R_a$ has a first terminal and a second terminal, which are connected, respectively, to the first terminal of the filtering capacitor $C_{in}$ and to a first terminal of the second resistor $R_b$, the second terminal of which is connected to the first ground. In practice, the second terminal of the first resistor $R_a$ and the first terminal of the second resistor $R_b$ form a node electrically coinciding with a first input terminal MULT of the control module 15.

The flyback converter 3 further comprises a third resistor $R_{ZCD}$ and a fourth resistor $R_s$. The first and second terminals of the third resistor $R_{ZCD}$ are connected, respectively, to the first terminal of the auxiliary winding $L_{aux}$, the second terminal of which is connected to the first ground, and to a second input terminal ZCD of the control module 15. The first and second terminals of the fourth resistor $R_s$ are connected, respectively, to the source terminal of the transistor M and to the first ground. Further, the first terminal of the fourth resistor $R_s$ is connected to a third input terminal CS of the control module 15. Once again with reference to the transistor M, the drain terminal is connected to the second terminal of the primary winding $L_p$, whereas the gate terminal is connected to an output terminal GD of the control module 15, which further includes a feedback terminal FB, described hereinafter, and a fourth input terminal GND, connected to the first ground.

In practice, the fourth resistor $R_s$ enables detection of the current that flows in the primary winding $L_p$ when the transistor M is on. In FIG. 1, the current that flows in the fourth resistor $R_s$ is designated by $I_p(t,\theta)$.

The flyback converter 3 further comprises a clamping circuit 20, which is arranged between the first and second terminals of the primary winding $L_p$ for limiting the spikes of the voltage present on the drain terminal of the transistor M, caused, for example, by parasitic inductances.

On its own secondary side, the flyback converter 3 comprises a feedback circuit 22, a diode D, referred to hereinafter as "output diode D", and a further capacitor $C_{out}$, referred to hereinafter as "output capacitor $C_{out}$"; typically, the output capacitor $C_{out}$ is of an electrolytic type.

The anode of the output diode D is connected to a first terminal of the secondary winding $L_s$, whereas the cathode is connected to a first terminal of the output capacitor $C_{out}$, the second terminal of which is connected to a second ground, as on the other hand also the second terminal of the secondary winding $L_s$. In general, the voltage across the output capacitor $C_{out}$ is referred to hereinafter as "output voltage $V_{out}$". Further, the output voltage $V_{out}$ represents the voltage that is to be regulated by the flyback converter 3. In FIG. 1, the current that flows in the output diode D is designated by $I_s(t,\theta)$.

The feedback circuit 22 is connected to the first terminal of the output capacitor $C_{out}$ and to the feedback terminal FB of the control module 15. In addition, the feedback circuit 22 is configured to generate an error signal proportional to the difference between the output voltage $V_{out}$ and a reference voltage, as well as for transferring the error signal on the primary side of the flyback converter 3, generally using an opto-coupler. This transfer entails generation of a control voltage $V_c$ on the primary side, and in particular on the feedback terminal FB of the control module 15. In this connection, the control module 15 generates on a own node an internal voltage $V_{int}$, and further has a fifth resistor $R_c$, which is arranged between the aforementioned node and the feedback terminal FB of the control module 15. Furthermore, the control module 15 and the feedback circuit 22 are coupled in such a way that, at output from the feedback terminal FB of the control module 15, a current $I_{FB}$ is present that depends upon the aforementioned error signal. The current $I_{FB}$ causes a voltage drop on the fifth resistor $R_c$. The aforementioned control voltage $V_c$ is, precisely, the voltage present on the feedback terminal FB of the control module 15 and depends upon the error signal in such a way as to regulate the output voltage $V_{out}$. To a first approximation, the control voltage $V_c$ may be considered constant because the band of the control loop is much lower than the frequency of the input voltage $V_{in}(\theta)$.

The control module 15 further comprises a multiplier 24, a comparator 26, a flip-flop 28 of a set-reset type, a driver 30, a starter circuit 32, a first logic gate 34 of an OR type, and a circuit 36 referred to hereinafter as "zero-current detection circuit 36".

In detail, the multiplier 24 has a first input, connected to the feedback terminal FB of the control module 15 for receiving the control voltage $V_c$, and a second input, connected to the first input terminal MULT for receiving the voltage present thereon, which is proportional to the input voltage $V_{in}(\theta)$ through the division ratio $R_2/(R_1+R_2)$ introduced by the resistive divider 16, where $R_1$ and $R_2$ are the values of resistance of the first and second resistors $R_a$, $R_b$. The multiplier 24 generates a voltage $Vcs_{REF}(\theta)$ on an own output, which is connected to a negative input terminal of the comparator 26. The voltage $Vcs_{REF}(\theta)$ has the form of a rectified sinusoid, the amplitude of which depends upon the control voltage $V_c$ and the effective voltage present on the supply line.

The positive input terminal of the comparator 26 is connected to the third input terminal CS of the control module 15 for receiving the voltage (designated by $Vcs(t,\theta)$) present on the fourth resistor $R_s$. The voltage $Vcs(t,\theta)$ is directly proportional to the current present in the primary winding $L_p$ when the transistor M is in conduction, i.e., during magnetization of the primary winding $L_p$ itself.

The output of the comparator 26 is connected to the reset input of the flip-flop 28, the output of which (designated by Q) is connected to the input of the driver 30, the output of which forms the output terminal GD of the control module 15. The output of the flip-flop 28 is further connected to the set input of the flip-flop 28 itself, by interposition of the starter circuit 32. In particular, the input of the starter circuit 32 is connected to the output Q of the flip-flop 28, whereas the output of the starter circuit 32 is connected to a first input of the first logic gate 34. The second input and the output of the first logic gate 34 are connected, respectively, to the output of the zero-current detection circuit 36 and to the set input of the flip-flop 28. The input of the ZCD circuit 36 is connected to the second input terminal ZCD of the control module 15.

In use, assuming that the transistor M is on, there occurs a linear growth of the current $I_p(t,\theta)$ in the primary winding $L_p$ and hence of the voltage $Vcs(t,\theta)$. When the voltage $Vcs(t,\theta)$ becomes equal to the voltage $Vcs_{REF}(\theta)$, the comparator 26 resets the output of the flip-flop 28, and the transistor M is turned off. Consequently, the voltage supplied by the resistive divider 16, which has the form of a rectified sinusoid, determines the peak value of the current in the primary winding $L_p$, which is thus enveloped by a rectified sinusoid.

When the transistor M turns off, the energy stored in the primary winding $L_p$ is transferred by magnetic coupling to the secondary winding $L_s$, and hence in the output capacitor $C_{out}$ until the secondary winding $L_s$ demagnetizes. Furthermore, as long as a current flows in the secondary winding $L_s$, the voltage of the drain terminal of the transistor M is equal to $V_{in}(\theta)+V_R$, where $V_R$ is the so-called reflected voltage, equal to $n \cdot V_{out}$, where n is the ratio between the number of the turns of the primary winding $L_p$ and the number of the turns of the secondary winding $L_s$ of the transformer 4.

Following upon demagnetization of the secondary winding $L_s$, the output diode D opens, and the drain terminal of the transistor M becomes floating and tends to assume a voltage equal to the input voltage $V_{in}(\theta)$ through damped oscillations caused by a parasitic capacitance resonating with the primary winding $L_p$. However, the fast drop in voltage that takes place on the drain terminal of the transistor M following upon demagnetization of the transformer 4 is coupled to the second input terminal ZCD of the control module 15 through the auxiliary winding $L_{aux}$ and the third resistor $R_{ZCD}$. Furthermore, the zero-current detection circuit 36 generates a pulse whenever it detects that a falling edge of the voltage present on its own input drops below a threshold. This pulse forces a corresponding change of the output of the flip-flop 28 and consequently leads to turning-on of the transistor M and start of a new switching cycle.

The starter circuit 32 enables start of the first switching cycle after turning-on of the flyback converter 3, i.e., when no signal is yet present on the second input terminal ZCD of the control module 15, and further prevents the flyback converter 3 from remaining blocked if for any reason the signal on the second input terminal ZCD of the control module 15 is lost.

Examples of the signals that are generated in use within the flyback converter 3 are illustrated in FIG. 2, which, in addition to the aforementioned quantities $I_p(t,\theta)$, $I_s(t,\theta)$, $Vcs(t,\theta)$, $Vcs_{REF}(\theta)$, shows:

the voltage $V_{DS}$ between the drain and source terminals of the transistor M;
the voltage $V_{in,pk} \sin \theta$, where $V_{in,pk}$ is the peak value of the input voltage $V_{in}$;
the voltage $V_{aux}$ present on the auxiliary winding $L_{aux}$;
the voltage $V_{ZCD}$ present on the second input terminal ZCD of the control module 15;
the thresholds $V_{ZCDarm}$ and $V_{ZCDtrig}$ of the voltage $V_{ZCD}$ at which the zero-current detection circuit 36 is armed and generates a pulse, respectively;
the state ARM of the zero-current detection circuit 36;
the signal sS (of a logic type) present on the set input of the flip-flop 28, and hence the pulses TRIGGER generated by the zero-current detection circuit 36;
the signal sR (of a logic type) present on the reset input of the flip-flop 28;
the signal sGD (of a logic type) present on the output Q of the flip-flop 28, which governs turning-on of the transistor M (it is assumed that the driver 30 does not introduce any delay); and
a so-called "freewheel" state FW, corresponding to the period in which there occurs demagnetization of the transformer 4.

In general, it should be noted that, in indicating the quantities, the fact of not rendering any dependence upon parameters (in the case in point, the phase $\theta$ or the time t) explicit does not imply that the quantity in question is necessarily constant.

In addition, FIG. 2 represents the following periods:
the period $T_{ON}$, in which the transistor M is on, i.e., in conduction, and hence the period in which the core of the transformer 4 is magnetized;
the period $T_{FW}$, in which demagnetization of the core of the transformer 4 occurs; and
the period $T_R$, i.e., the delay that elapses between complete demagnetization of the core of the transformer 4 and next turning-on of the transistor M, i.e., start of new magnetization of the core of the transformer 4.

The resulting plots of the currents $I_p(t,\theta)$, $I_s(t,\theta)$, as well as the corresponding envelopes of the corresponding peaks $I_{pkp}(\theta)$, $I_{pks}(\theta)$ and the average, cycle by cycle, $I_{in}(\theta)$ of the current in the primary winding $L_p$ are illustrated in FIG. 3. For completeness, designating by T the switching period, we have $T=T_{FW}+T_R+T_{ON}$.

For practical purposes, the flyback converter 3 is of the quasi-resonant type. In fact, turning-on of the transistor M is synchronized with the instant of complete demagnetization of the transformer 4 (i.e., with the instant when the current in the secondary winding $L_s$ becomes zero), albeit with a delay such that it occurs at a so-called "valley" of the voltage $V_{DS}$. Turning-off of the transistor M is, instead, determined by detecting the moment when the current in the primary winding $L_p$ reaches a given value. Furthermore, the flyback converter 3 is of the current-mode control type, and in particular of the peak-current-mode control type. In addition, since the peak envelope of the current that flows in the fourth resistor $R_s$, and hence in the primary winding $L_p$, is sinusoidal, a power factor higher than 0.9 is obtained.

In practice, as illustrated in FIG. 4, the flyback converter 3 implements an electrical layout formed by a conversion stage 40, which is operatively coupled to the control module 15. In particular, the conversion stage 40 receives at input the input voltage $V_{in}(\theta)$ and is controlled by the control module 15 in such a way as to supply the output voltage $V_{out}$. As illustrated in FIG. 4, control of the conversion stage 40 occurs thanks to the aforementioned signal sGD (more precisely, thanks to the voltage $V_{GA}$ present on the gate terminal of the transistor M), as well as thanks to the voltage $V_{ZCD}$. Further, even though not illustrated in FIG. 2, the conversion stage 40 is controlled also on the basis of the feedback present between the output of the conversion stage 40 and the control module 15. In addition, in order to control the conversion stage 40, the control module 15 receives at input, through the resistive divider 16, a fraction of the input voltage $V_{in}(\theta)$, designated by $V_{MULT}$ in FIG. 4.

FIG. 5 shows a further example of converter, and in particular shows a boost converter 50, which is here described just as regards the differences with respect to the flyback converter 3. In FIG. 5, components already illustrated in FIG. 1 have the same reference numbers, except where otherwise specified. The clamping circuit 20 is absent.

In detail, instead of the transformer 4, a coupled inductor 54 is present, which includes the primary winding and the auxiliary winding, designated, respectively, by $L_1$ and $L_{aux}$, but not the secondary winding. The primary winding and the auxiliary winding $L_1$ and $L_{aux}$ share a same magnetic core. The first terminal of the primary winding $L_1$ is still connected to the first terminal of the filtering capacitor $C_{in}$, but the second terminal is connected to the anode of the output diode D. The auxiliary winding $L_{aux}$ is electrically connected as in the case of the flyback converter 3 and performs the same electrical function. The drain terminal of the transistor M is still connected to the second terminal of the primary winding $L_1$. Hence, it is now connected to the anode of the output diode D.

The feedback circuit, designated by 52, comprises a sixth resistor $R_d$ and a seventh resistor $R_e$, which form a corresponding resistive divider, which is arranged between the cathode of the output diode D and ground and the central node of which is connected to the feedback terminal FB of the control module, here designated by 55.

The control module 55 comprises, instead of the fifth resistor $R_c$, an amplifier 58, referred to hereinafter as "error amplifier 58". The non-inverting terminal of the error amplifier 58 is connected to a reference node, which is set at an internal reference voltage $V_{ref\_int}$, whereas the non-inverting terminal forms the feedback terminal FB of the control module 55. The output of the error amplifier 58 is connected to the first input of the multiplier 24, the second input of which is still connected to the resistive divider 16. The output of the multiplier 24 is connected to the negative input terminal of the comparator 26, the positive input terminal of which is connected to the third input terminal CS of the control module 55.

The boost converter 50 further comprises a loop-compensation circuit 60, which extends between a respective first node and a respective second node and includes an eighth resistor $R_f$ and a ninth resistor $R_g$, as well as a further capacitor 62, referred to hereinafter as "additional capacitor 62". In particular, the eighth resistor $R_f$ is arranged between the aforementioned first and second nodes of the loop-compensation circuit 60 and is arranged in parallel to the series circuit formed by the additional capacitor 62 and by the ninth resistor $R_g$. Furthermore, the first node of the loop-compensation circuit 60 is connected to the feedback terminal FB of the control module 55, whereas the second node of the loop-compensation circuit 60 is connected to the output of the error amplifier 58.

In practice, the error amplifier 58 compares a portion of the output voltage $V_{out}$ with the internal reference voltage $V_{ref\_int}$ and generates the control voltage $V_c$, which depends upon an error signal proportional to the deviation between the aforementioned portion of the output voltage $V_{out}$ and the internal reference voltage $V_{ref\_int}$ for regulating the output voltage $V_{out}$. As explained previously, to a first approximation, the control voltage $V_c$ may be considered constant. The subsequent operation of the boost converter 50 is similar to that of the flyback converter 3. Examples of the time plots of the signals sS, sR, sGD and of the current $I(t,\theta)$ in the primary winding $L_1$ are illustrated in FIGS. 6a and 6b. Further, FIG. 6a shows a signal sZCD indicating the period in which the current $i_L$ through the primary winding $L_1$ is zero.

In greater detail, the boost converter 50 operates in the so-called "transition mode" (TM) since the current in the primary winding $L_1$ vanishes for a short period of time.

This being said, irrespective of the topology of the switching converter considered (flyback, boost, buck, etc.), there occurs generation of a sinusoidal reference, by a sort of line-sensing circuitry that includes a resistive divider and enables detection of a percentage of the rectified line voltage. This entails a dissipation on the resistive divider, which, according to the application and the corresponding sizing of the switching converter, may range between about ten milliwatts and some tens of milliwatts. This loss is hence not negligible and the desire to reduce it as much as possible is particularly felt.

BRIEF SUMMARY

One embodiment of the present disclosure is a control module for a switching converter that will overcome at least in part the drawbacks of the known art.

One embodiment of the present disclosure is a module for controlling a switching converter, which includes an inductor element and one switch element and is configured to generate an output electric quantity starting from an input electric quantity. The control module includes a switch control circuit configured to generate a command signal for controlling switching of the switch element; and an estimator stage configured to generate an estimation signal proportional to the input electric quantity, based on the command signal and a first input signal indicating a time interval in which the inductor element is demagnetized. The switch control circuit is configured to generate the command signal based on the estimation signal.

BRIEF DESCRIPTION OF THE SEVERAL VIEWS OF THE DRAWINGS

For a better understanding of the present disclosure, preferred embodiments thereof are now described, purely by way of non-limiting example and with reference to the attached drawings, wherein:

FIGS. 1 and 5 show circuit diagrams of switching converters of a known type;

FIGS. 2 and 3 show time plots of signals generated within the switching converter illustrated in FIG. 1;

FIG. 4 shows a block diagram regarding the switching converter illustrated in FIG. 1;

FIGS. 6a and 6b show time plots of signals generated within the switching converter illustrated in FIG. 5;

FIG. 8 shows a circuit diagram of a portion of the switching converter illustrated in FIG. 7;

DETAILED DESCRIPTION

Figure 5:
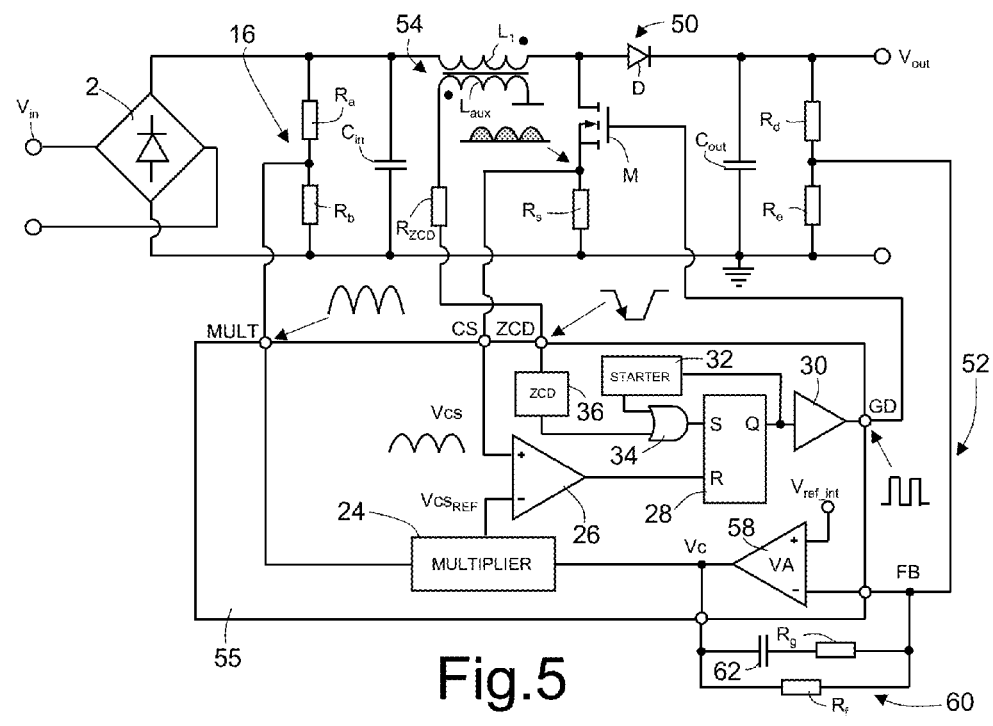

The present Applicant has noted how, given a switching converter, it is possible to generate a signal proportional to the input voltage $V_{in}(\theta)$, without resorting to a resistive divider, but rather implementing an estimator circuit, which receives at input signals generated in use by the switching converter. This being said, in what follows the present control module is described with reference to a boost converter, even though it may be used also in the case of converters of a different type. In particular, the present control module is described with reference to the boost converter 60 illustrated in FIG. 7, which in turn is described with reference to the differences with respect to the boost converter 50 illustrated in FIG. 5. Components of the boost converter 60 already present in the boost converter 50 are designated by the same reference numbers, except where otherwise specified.

In detail, the control module of the boost converter 60, designated by 65, includes an estimator circuit 67 and is without the first input terminal MOLT. Further, the boost converter 60 is without the resistive divider 16.

In greater detail, the estimator circuit 67 comprises a current generator 68 and a first switch 70, a second switch 72, and a third switch 74, as well as a respective resistor 76 and a respective capacitor 78, referred to hereinafter as "estimation resistor 76" and the "estimation capacitor 78", respectively.

In particular, the current generator 68 is arranged between a first internal node $N_1$ and a second internal node $N_2$ and is configured to inject a constant current I into the second internal node $N_2$.

The first switch 70 is connected between the second internal node $N_2$ and a third internal node $N_3$.

The estimation capacitor 78 is connected between the third internal node $N_3$ and ground. The estimation resistor 76 is connected to the third internal node $N_3$ and to the second switch 72, which is further connected to ground. In other words, the second switch 72 and the estimation resistor 76 form a sort of series circuit arranged in parallel to the estimation capacitor 78. In addition, the third internal node $N_3$ is connected to the second input of the multiplier 24.

The third switch 74 is connected between the second internal node $N_2$ and ground.

The first, second, and third switches 70, 72, 74 are controlled by a first command signal, a second command signal, and a third command signal, respectively. Further, the third command signal is equal to the logic negation of the first command signal. Consequently, it is possible to designate the first, second, and third command signals by A, B and $\overline{A}$, respectively.

In detail, when A='1', the current generator 68 is electrically connected to the third internal node $N_3$. Instead, when A='0', the current generator 68 is connected to ground. Furthermore, when B='1', the estimation capacitor 78 is connected in parallel to the estimation resistor 76. Instead, when B='0', the estimation resistor 76 is floating.

It is thus possible to designate by $T_A$ the period in which the estimation capacitor 78 is being charged, i.e., when A='1' and B='0'. Likewise, it is possible to designate by $T_B$ the period in which the estimation capacitor 78 is discharging, i.e., when A='0' and B='1'. Once again, it is possible to designate by $T_{AB}$ the period in which the estimation capacitor 78 is floating, i.e., when A='0' and B='0'. In addition, assuming a switching period $T(\theta)=T_A(\theta)+T_B(\theta)+T_{AB}(\theta) \ll R*C \ll 1/f_{line}$, where $f_{line}$ is the frequency of the supply line, and R and C are, respectively, the resistance of the estimation resistor 76 and the capacitance of the estimation capacitor 78, it is possible to ignore the ripple on the estimation capacitor 78, and further it may be assumed that the voltage on the estimation capacitor 78 follows the waveform of the line voltage. This being said, by applying the charge balance on the estimation capacitor 78, we obtain:

$$IT_A(\theta) = \frac{V_e(\theta)}{R} T_B(\theta) \tag{1}$$

where R is the resistance of the estimation resistor 76. Consequently, the voltage $V_e(\theta)$ on the estimation capacitor 78 itself is $$V_e(\theta) = RI \frac{T_A(\theta)}{T_B(\theta)} \tag{2}$$

This being said, the calculation of the balance of the magnetic flux on the primary winding $L_1$ yields:

$$V_{in}(\theta)T_{ON}(\theta) = [(V_{out}+V_F)-V_{in}(\theta)]T_{FW}(\theta) \tag{3}$$

where $T_{FW}(\theta)$ is the period in which demagnetization of the core of the primary winding $L_1$ occurs, whereas $T_{ON}(\theta)$ is the period in which the transistor M is in conduction, and hence the period in which magnetization of the core of the primary winding $L_1$ takes place.

From Eq. (3) we have:

$$\frac{V_{in}(\theta)}{V_{out}+V_F} = \frac{T_{FW}(\theta)}{T_{ON}(\theta)+T_{FW}(\theta)} = \frac{T_{FW}(\theta)}{T(\theta)-T_R} \tag{4}$$

where $V_{out}+V_F$ is, to a first approximation, constant, and $V_F$ is the voltage drop on the output diode D.

Once again with reference to Eq. (2), by imposing $T_A=T_{FW}$ and $T_B=T-T_R$, we obtain:

$$V_e(\theta) = RI \frac{T_{FW}(\theta)}{T(\theta)-T_R} \tag{5}$$

i.e., the voltage $V_e(\theta)$ has the same plot, but for a scale factor, as the input voltage $V_{in}(\theta)$. In fact, from Eqs. (4) and (5) we obtain:

$$V_e(\theta) = RI \frac{V_{in}(\theta)}{(V_{out} + V_F)} = K V_{in}(\theta) \quad (6)$$

which demonstrates the direct proportionality present between the voltage $V_e(\theta)$ on the estimation capacitor 78, and hence at input to the multiplier 24, and the input voltage $V_{in}(\theta)$. The voltage $V_e(\theta)$ and the voltage $V_{in}(\theta)$ hence have a same phase, and consequently a same time plot.

Figure 7:
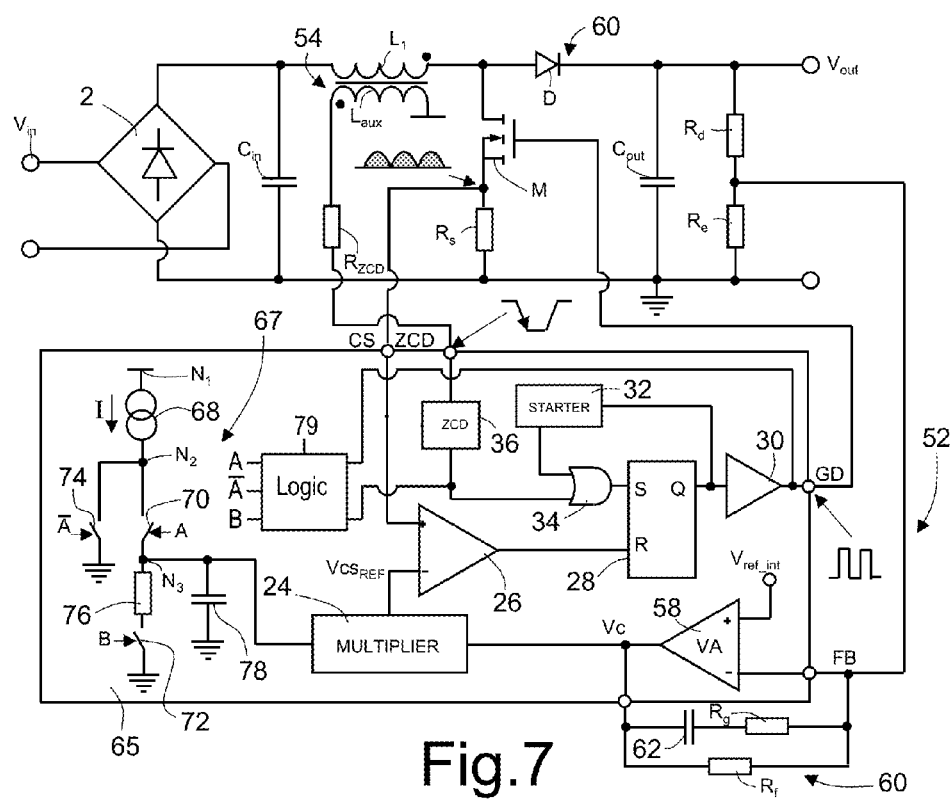
FIGS. 7 and 10 show circuit diagrams of switching converters including the present control module.

For the boost converter of FIG. 7, the control module 65 includes a logic circuit 79 that provides the control signals A, $\overline{A}$, and B based on the signals sZCD and sGD such that A=sFW and B=$\overline{\text{sZCD}}$, where sFW is a signal that is equal to '1' when there occurs demagnetization of the primary winding L1, and is equal to '0' during the magnetization of the primary winding L1 or when the signal sZCd is equal to '1', whereas the signal $\overline{\text{sZCD}}$ is equal to the logic negation of the signal sZCD, which is equal to '1' when the primary winding L1 is completely demagnetized, i.e., when the current $I(t,\theta)$ in the primary winding L1 is zero, and is equal to '0' otherwise.

In greater detail, the signal sZCD may be generated, for example, by the zero-current detection circuit 36. In this case, the zero-current detection circuit 36 is provided not only with the aforementioned output connected to the first logic gate 34, but also with a further output, on which it supplies the signal sZCD. In addition, the zero-current detection circuit 36 continues to provide, on the output connected to the logic gate 34, a signal such that on the set input of the flip-flop 28 the aforementioned signal sS is present.

Figure 9:
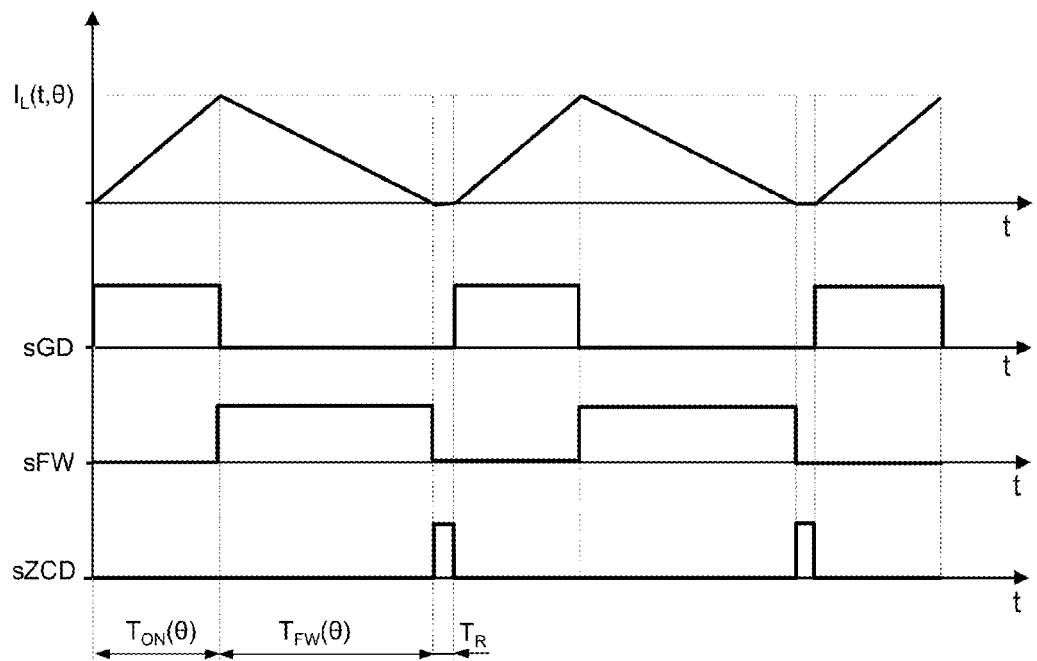
FIG. 9 shows time plots of signals generated within the switching converter illustrated in FIG. 7.

As regards the signal sFW, it is generated, as illustrated in FIG. 8, on the basis of the signal sZCD and of the signal sGD, which, as has been said, is equal to '1' when the transistor M is in conduction and is equal to '0' when the transistor M is inhibited. In particular, even though not illustrated in FIG. 7, the logic circuit 79 of the control module 65 comprises a second logic gate 80 of a negated OR type, which receives at input the signals sGD and sZCD and generates the signal sFW, and logic inverters configured to generate the signals $\overline{\text{sZCD}}$ and $\overline{\text{sFW}}$, starting, respectively, from the signals sZCD and sFW. The electrical connections that involve the second logic gate 80 are not shown, as neither, on the other hand, are the logic inverters connected to the second switch 72 and the third switch 74 and designed to generate the signals $\overline{\text{sZCD}}$ and $\overline{\text{sFW}}$. Examples of the signals sFW, sGD and sZCD are represented in FIG. 9.

Figure 10:
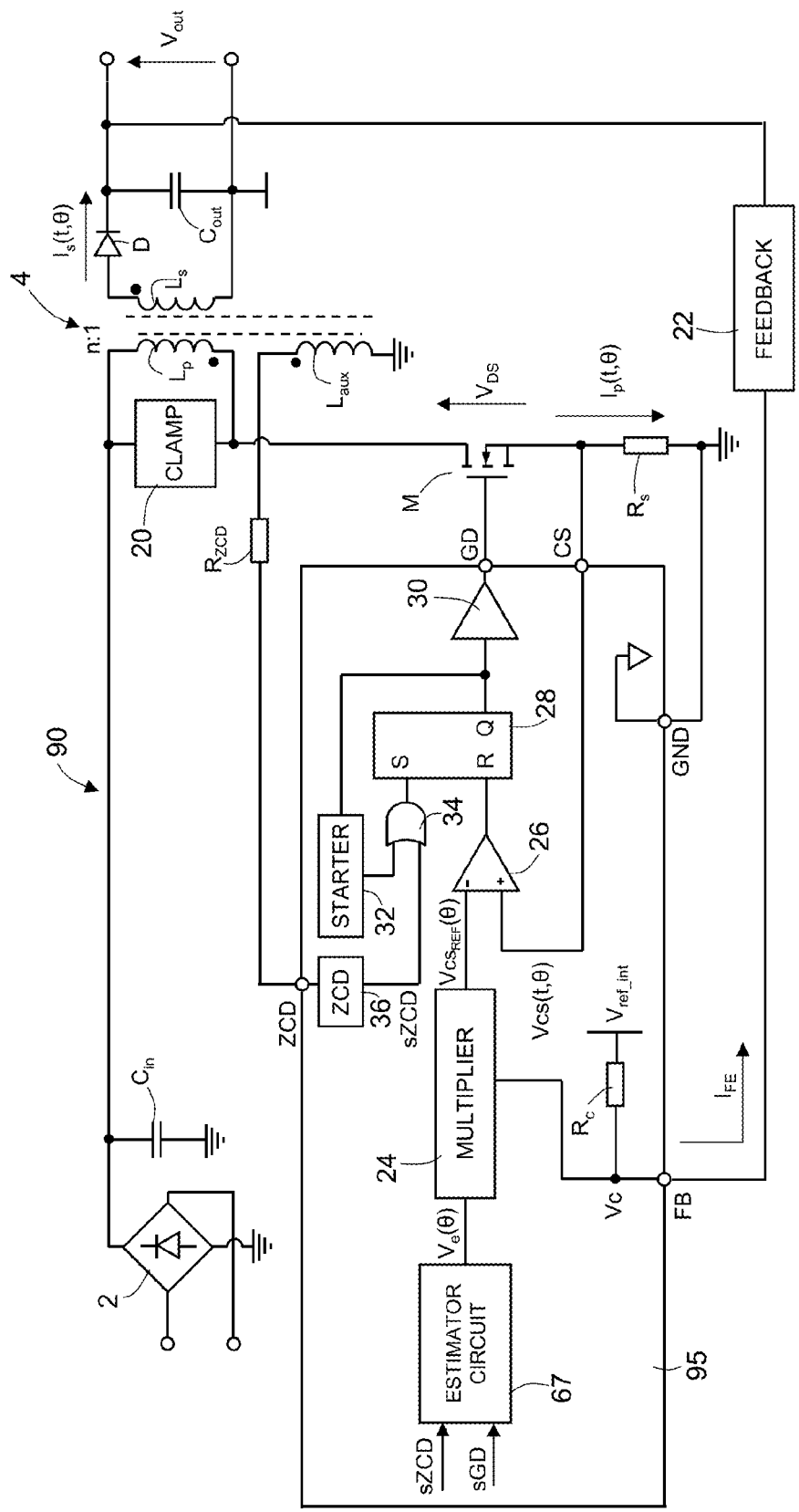

As illustrated in FIG. 10, and as mentioned previously, the estimator circuit 67 may be used also in the case of a flyback converter, here designated by 90. In this case, the estimator circuit 67 is again included in the control module, designated by 95. Further, we have A=sFW and B=sGD, for the reasons described in what follows. In FIG. 10, the connections between the estimator circuit 67 and the zero-current detection circuit 36 and the output Q of the flip-flop 28, as well as the second logic gate 80 and inverter for producing $\overline{A}$, are not represented.

In detail, the balance of the magnetic flux on the primary winding, designated by $L_p$, yields:

$$V_{in}(\theta) T_{ON}(\theta) = n(V_{out} + V_F) T_{FW}(\theta) \quad (7)$$

whence we obtain:

$$V_{in}(\theta) = n(V_{out} + V_F) \frac{T_{FW}(\theta)}{T_{ON}(\theta)} \quad (8)$$

Recalling Eq. (2), from Eq. (8) it emerges how, by imposing $T_A = T_{FW}$ and $T_B = T_{ON}$, and hence A=sFW and B=sGD, we obtain:

$$V_e(\theta) = RI \frac{V_{in}(\theta)}{n(V_{out} + V_F)} = K_1 V_{in}(\theta) \quad (9)$$

Furthermore, the estimator circuit 67 may be used also in the case of converters of topologies equivalent to the flyback topology, i.e., converters having the same conversion ratio $V_{out}/V_{in}$ as the one that characterizes flyback converters. In this case, the first, second, and third command signals A, B and $\overline{A}$ are the same as what has been described with reference to FIG. 10.

Examples of topologies equivalent to the flyback topology are illustrated synthetically in FIGS. 11*a*-11*d*. In FIGS. 11*a*-11*d*, components that have already been illustrated previously are designated by the same reference numbers. Further, FIGS. 11*a*-11*d* are described briefly, with reference just to the differences with respect to what has been described with reference to FIG. 10. In addition, the primary winding is referred to as "first inductor $L_1$". Again, the circuit diagrams illustrated in FIGS. 11*a*-11*d* are principle circuit diagrams, and hence they are not complete, but rather are limited to showing some components and some electrical connections of the corresponding converters in order to highlight the type of the converters themselves, which substantially depends upon the arrangement of the reactive elements and of the transistor M.

Figure 11A:
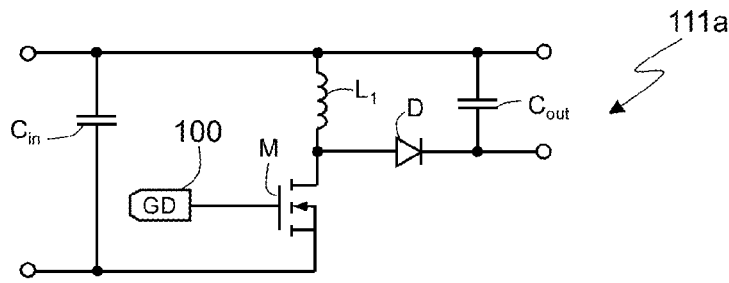
FIGS. 11a-11d show principle circuit diagrams of converters equivalent to the converter illustrated in FIG. 10.

In particular, FIG. 11*a* shows a buck-boost converter 111*a*, where the anode of the output diode D is connected to the second terminal of the first inductor $L_1$, whereas the output capacitor $C_{out}$ is connected to the first terminal of the first inductor $L_1$ and to the cathode of the output diode. Furthermore, designated in FIG. 11*a* is by 100 is a gate-driving stage, which includes the control module 95. For the reason explained previously, the gate-driving stage 100 is illustrated as being without inputs, even though in actual fact it possesses the aforementioned inputs ZCD and CS, as well as the feedback terminal FB, connected in a per se known manner.

Figure 11B:
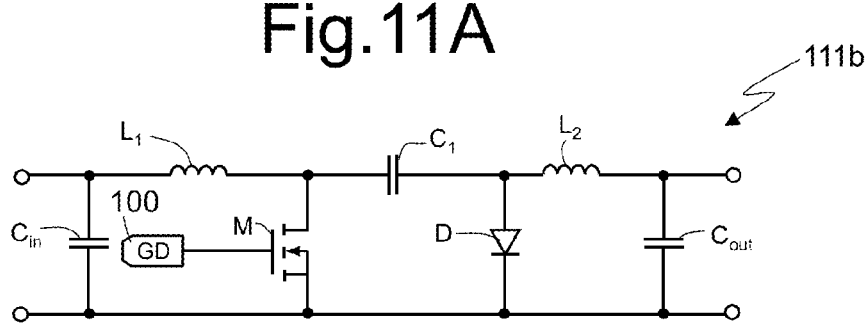

FIG. 11*b* shows a Cuk converter 111*b*, which further comprises an additional capacitor $C_1$, which is connected to the second terminal of the first inductor $L_1$ and to the anode of the output diode D, the cathode of which is connected to the source terminal of the transistor M. In addition, the second inductor $L_2$ is present, which is connected between the anode of the output diode D and a first terminal of the output capacitor $C_{out}$, the second terminal of which is connected to the source terminal of the transistor M.

Figure 11C:
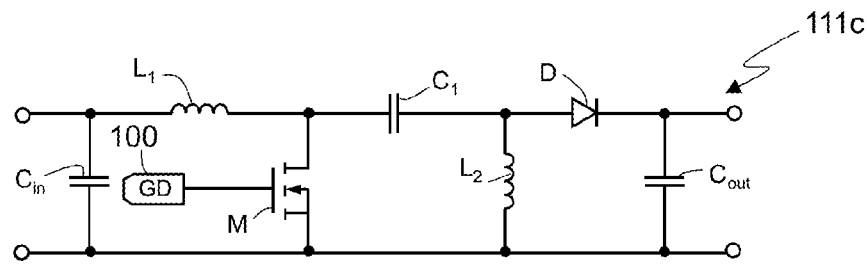

FIG. 11*c* shows a SEPIC converter 111*c*, in which the positions of the output diode D and of the second inductor $L_2$ are reversed as compared to the Cuk converter 111*b*. Consequently, the anode of the output diode D and a first terminal of the second inductor $L_2$ are connected to the terminal of the additional capacitor $C_1$ not connected to the first inductor $L_1$. The second terminal of the second inductor $L_2$ is connected to the source terminal of the transistor M. The output capacitor $C_{out}$ is arranged between the cathode of the output diode D and the source terminal of the transistor M.

Figure 11D:
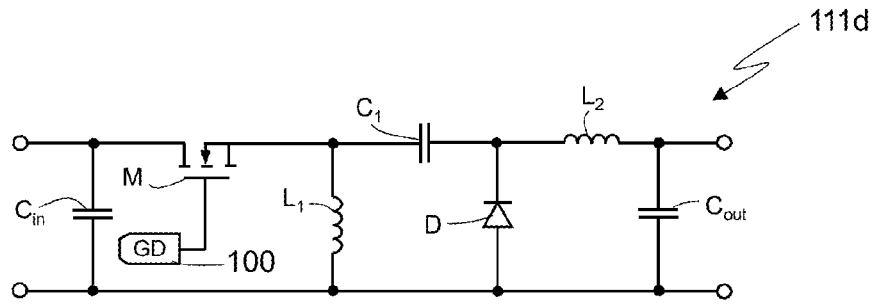

FIG. 11d shows a Zeta converter 111d, also known as "inverted SEPIC", where the drain and source terminals of the transistor M are connected, respectively, to a first terminal of the input capacitor $C_{in}$ and to a first terminal of the first inductor $L_1$, the second terminal of which is connected to the second terminal of the input capacitor $C_{in}$. The additional capacitor $C_1$ is arranged between the first terminal of the first inductor $L_1$ and the cathode of the output diode D, the anode of which is connected to the second terminal of the first inductor $L_1$. A first terminal of the second inductor $L_2$ is connected to the cathode of the diode D. The output capacitor $C_{out}$ is arranged between the second terminal of the second inductor $L_2$ and the anode of the output diode D.

Figure 12:
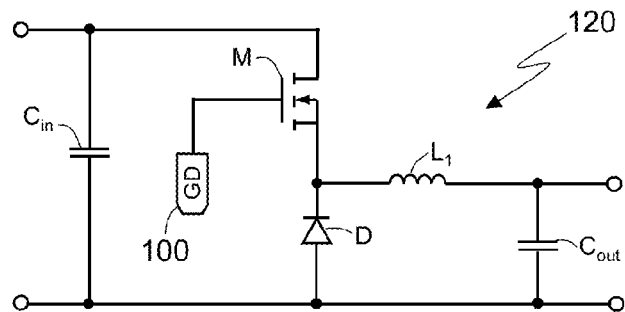
FIGS. 12 and 13 show principle circuit diagrams of switching converters that are equivalent to one another.

As illustrated in FIG. 12, the estimator circuit 67 may be used also in the case of a buck converter 120. In particular, FIG. 12 shows a principle diagram of the buck converter 120, in a way similar to the representation of FIGS. 11a-11d, i.e., without including all the components and the corresponding connections.

In detail, the drain and source terminals of the transistor M are connected, respectively, to a first terminal of the input capacitor $C_{in}$ and to the cathode of the output diode D, the anode of which is connected to the second terminal of the input capacitor $C_{in}$. A first terminal of the first inductor $L_1$ is connected to the cathode of the output diode D, whereas a second terminal of the first inductor $L_1$ is connected to a first terminal of the output capacitor $C_{out}$, the second terminal of which is connected to the anode of the output diode.

In this case, the estimator circuit 67 is still included in the gate-driving stage 100. Further, we have $A=\overline{sZCD}$ and $B=sGD$, for the reasons given below.

In detail, the balance of the magnetic flux on the first inductor $L_1$ yields:

$$[V_{in}(\theta)-V_{out}]T_{ON}(\theta)=(V_{out}+V_F)T_{FW}(\theta) \quad (10)$$

whence, noting that $V_F \ll V_{out}$, we obtain, to a first approximation, $$\frac{V_{in}(\theta)}{V_{OUT}} = \frac{T_{ON}(\theta)+T_{FW}(\theta)}{T_{ON}(\theta)} = \frac{T(\theta)-T_R}{T_{ON}(\theta)} \quad (11)$$

Recalling Eq. (2), from Eq. (11) it is highlighted how, by imposing $T_A=T-T_R$ and $T_B=T_{ON}$, and hence $A=\overline{sZCD}$ and $B=sGD$, we obtain:

$$V_e(\theta) = RI\frac{V_{in}(\theta)}{V_{out}} = K_2V_{in}(\theta) \quad (12)$$

The estimator circuit 67 may be used also in the case of converters of topologies equivalent to the buck topology. In this case, the first, second, and third command signals A, B and $\overline{A}$ are the same as what has been described with reference to FIG. 12.

Figure 13:
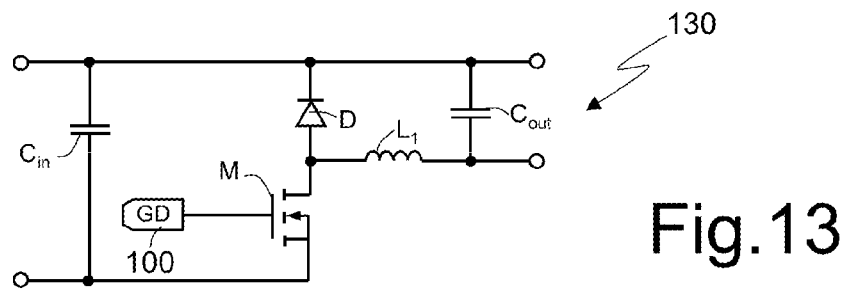

An example of a topology equivalent to the buck topology is illustrated synthetically in FIG. 13.

In particular, FIG. 13 shows a reverse-buck converter 130, where the cathode of the output diode D and a first terminal of the output capacitor $C_{out}$ are connected to a first input terminal $C_{in}$. The anode of the output diode D and the second terminal of the output capacitor $C_{out}$ are connected, respectively, to a first terminal and a second terminal of the first inductor $L_1$. The drain and source terminals of the transistor M are connected, respectively, to the first terminal of the first inductor $L_1$ and to the second terminal of the input capacitor $C_{in}$.

Figure 14:
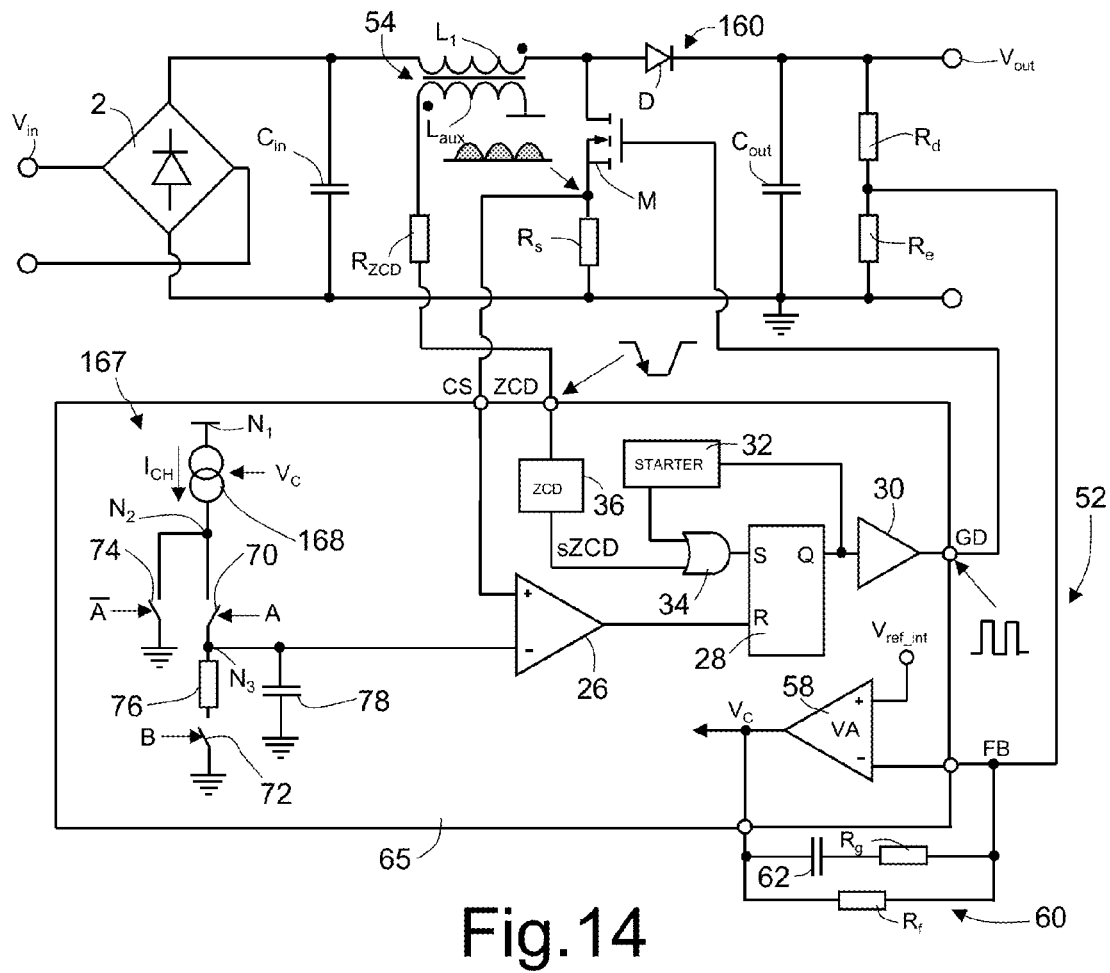
FIG. 14 shows a circuit diagram of a further switching converter including the present control module.

FIG. 14 shows a further embodiment, described in what follows as regards the differences from the embodiment illustrated in FIG. 7.

In detail, the boost converter, designated by 160 is without the multiplier 24. Furthermore, the current generator, designated by 168, of the estimator circuit, designated by 167, is of a variable type.

In greater detail, the current generator 168 receives at input the control voltage $V_c$ generated by the error amplifier 58. Furthermore, in a per se known manner, the current generated by the current generator 168 is directly proportional to the control voltage $V_c$. In other words, designating by $I_{CH}$ the current generated by the current generator 168, we have $I_{CH}=G_M \cdot V_c$, with $G_M$ constant and equal to the transconductance of the current generator 168.

The third internal node $N_3$ of the estimator circuit 167 is directly connected to the negative input terminal of the comparator 26.

This being said, and recalling that Eqs. (3) and (4) still apply, the charge balance on the estimation capacitor 78 yields:

$$I_{CH}(\theta)T_{FW}(\theta) = \frac{Vcs_{REF}(\theta)}{R}[T(\theta)-T_R] \quad (13)$$

where $V_e$ is set equal to $Vcs_{REF}$.

It follows that:

$$Vcs_{REF}(\theta) = RG_M V_C \frac{T_{FW}(\theta)}{T(\theta)-T_R} \quad (14)$$

Applying Eq. (4) and expressing $V_{in}(\theta)$ as $V_{in,pk}\sin(\theta)$, where $V_{in,pk}$ is the input peak voltage, we finally obtain:

$$Vcs_{REF}(\theta) = V_c \frac{G_M R}{V_{out}+V_F} V_{in,pk} \sin\theta. \quad (15)$$

Figure 15A:
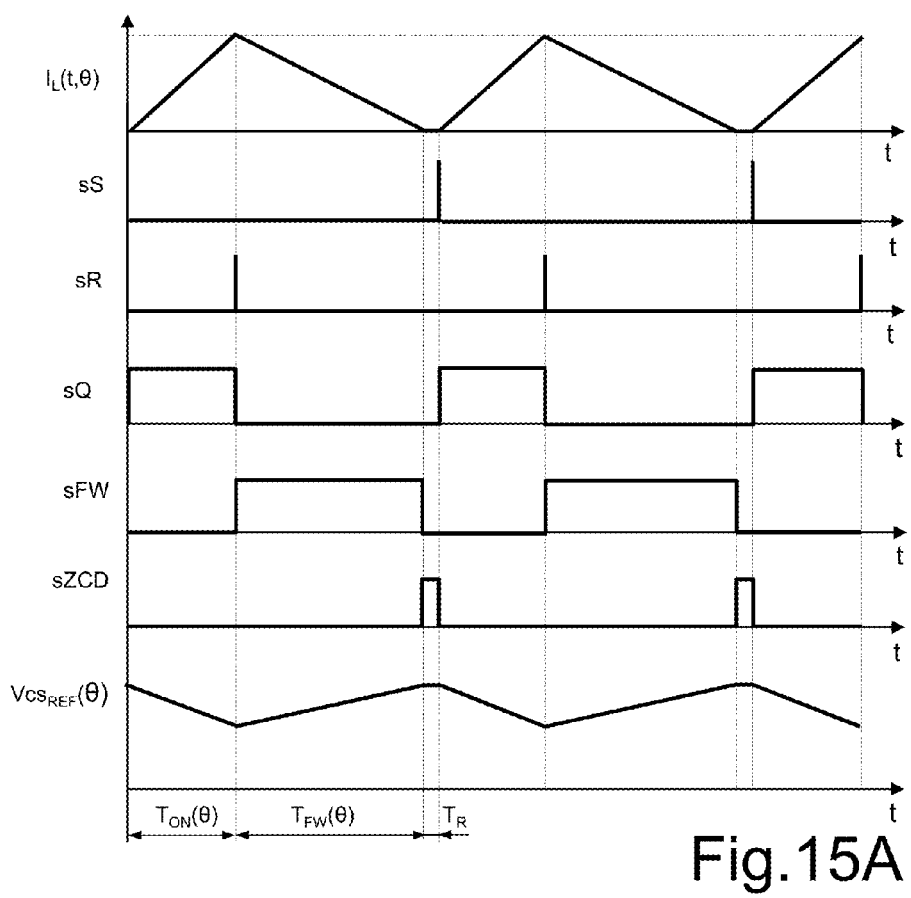
FIGS. 15a and 15b show time plots of signals generated within the switching converter illustrated in FIG. 14.
Figure 15B:
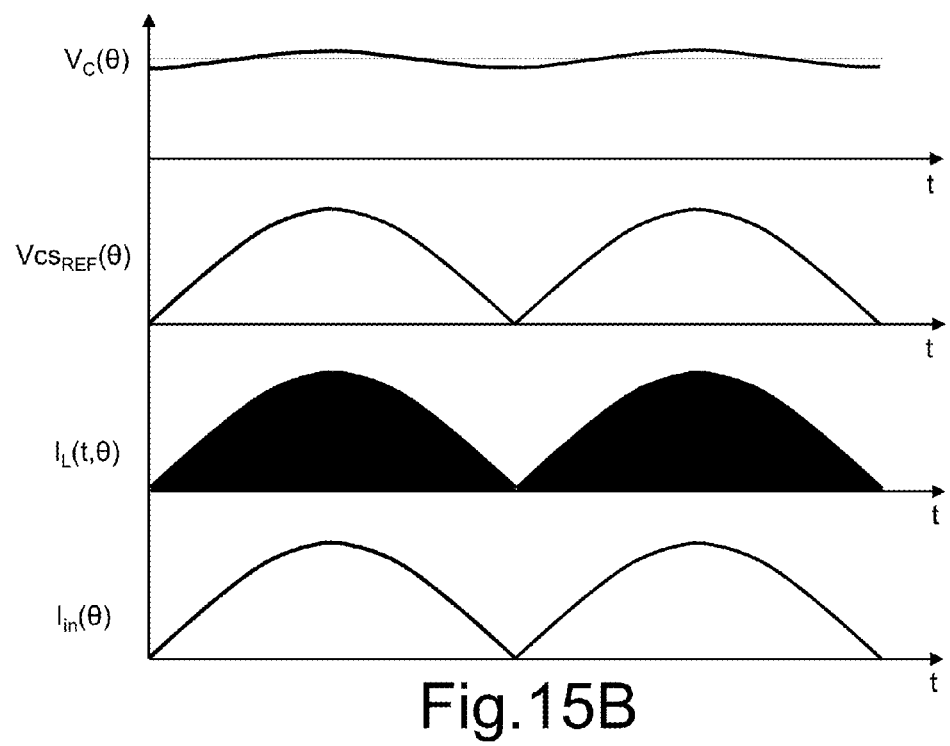

Considering the boost converter 60 of a known type illustrated in FIG. 5, and designating by $Vcs_{REF}'$ the voltage present on the output of the multiplier 24, we have $$Vcs_{REF}'(\theta)=K_M V_c \text{MULT}(\theta)=K_M K_P V_c V_{in,pk}\sin\theta \quad (16)$$

where $K_P=R_2/(R_1+R_2)$, and $K_M$ is the gain of the multiplier 24. Consequently, considering Eqs. (15) and (16), it may be noted how $Vcs_{REF}=Vcs_{REF}'$, if $K_M K_P=(G_M R)/(V_{out}+V_F)$. Examples of signals generated within the boost converter 160 are illustrated in FIGS. 15a and 15b.

In practice, by adopting a current generator variable in a way directly proportional to the control voltage $V_c$, the voltage $V_e(\theta)$ that is obtained on the estimation capacitor 78 may be equated to the voltage $Vcs_{REF}$ generated traditionally by the multiplier 24, which commonly generates a reference signal that is directly proportional to the control voltage $V_c$ and has the same profile as the voltage present on the input capacitor $C_{in}$. It is hence possible to remove the multiplier 24, thus simplifying the control module and reducing the area thereof. Furthermore, even though FIG. 14 refers purely by way of example to a boost converter, the current generator 168 of a variable type may be used in converters of any type, such as, for example, flyback converters or buck converters and/or equivalent converters. In this way, it is possible to remove the multiplier also in these converters.

Figure 16:
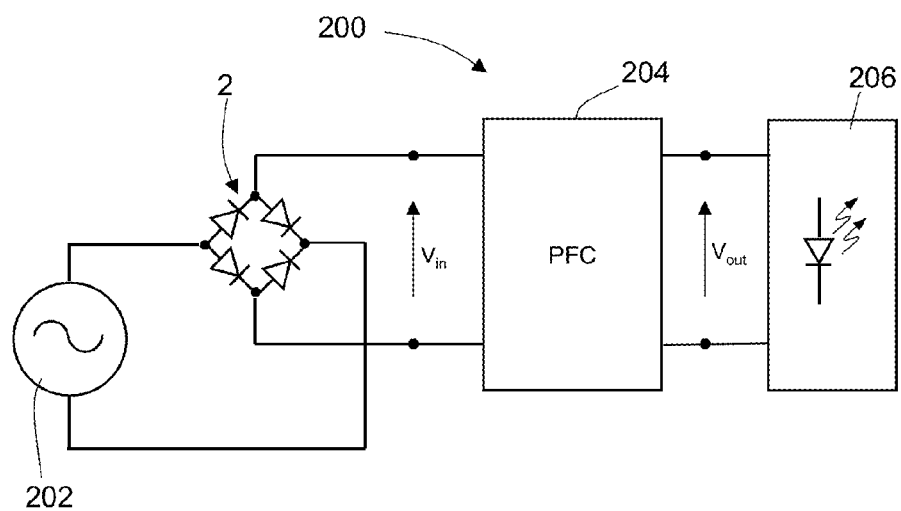
FIG. 16 shows a block diagram of a lighting system.

Irrespective of the presence or otherwise of the multiplier, any one of the switching converters previously described (hence, including the estimator circuit) may be used for supplying, for example, one or more solid-state lighting devices. For instance, FIG. 16 shows a lighting system 200, which, without any loss of generality, is connected to an a.c. voltage generator 202. The lighting system 200 comprises the bridge rectifier 2 and a switching converter 204 according to any one of the embodiments previously described. Furthermore, the lighting system 200 comprises a load 206 formed, for example, by a LED or an array of LEDs.

From what has been described and illustrated previously, the advantages that the present solution affords emerge clearly.

In particular, the present control module enables generation of the voltage $Vcs_{REF}(\theta)$ in such a way that it has the form of a rectified sinusoid and an amplitude that depends upon the control voltage $V_c$, without any need to couple a resistive divider to the input capacitor $C_{in}$, and hence eliminating the losses associated to the aforesaid resistive divider.

Furthermore, the present control module may be applied also in the case where at input to the converter a d.c. voltage is present, instead of an a.c. voltage, as also in the case where the converter is configured to regulate an output current instead of an output voltage. In the latter case, the feedback circuit generates a signal proportional to the output current, instead of to the output voltage, in a per se known manner.

In addition, in the case where the current generator of the estimator circuit is variable and directly proportional to the control voltage $V_c$, the control module is without the traditional multiplier.

In conclusion, it is clear that modifications and variations may be made to what has been described and illustrated herein, without thereby departing from the scope of the present disclosure.

For instance, the third switch 74 may be connected not only to the second internal node $N_2$, but also to the first internal node $N_1$, instead of to ground. Furthermore, the positions within the series circuit of the estimation resistor 76 and of the second switch 72 may be reversed.

Furthermore, the present control module may be included also in a switching converter controlled in the so-called "voltage mode", or else also in a switching converter controlled in average-current mode.

Finally, the present estimator circuit may be used also outside a control module of a switching converter, i.e., independently of subsequent use of the voltage $V_e$ within a control loop of a switching converter.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control module for controlling a switching converter, which includes an inductor element and a switch element and is configured to generate an output electric quantity starting from an input electric quantity, said control module comprising:
a switch control circuit configured to generate a command signal for controlling switching of the switch element; and
an estimator stage configured to generate an estimation signal that estimates said input electric quantity; based at least in part on a length of time during which both the command signal indicates that the switch element is switched to a non-conductive state and a first control signal indicates said inductor element is magnetized; said switch control circuit being configured to generate the command signal based on the estimation signal.

2. The control module according to claim 1, comprising a reference stage, which includes the estimator stage and is configured to receive a second control signal that is a function of the output electric quantity and of an electrical reference quantity, said reference stage being configured to generate a comparison signal that depends upon the second control signal and is said input electric quantity; said switch control circuit being further configured to generate the command signal based on the comparison signal.

3. The control module according to claim 2, further comprising a zero-crossing detector configured to receive a first input signal, indicative of a current through the inductor element, and produce the first control signal based on a comparison of the first input signal with a threshold indicative of zero current or close to zero current, wherein the switch control circuit is configured to receive the comparison signal, the first control signal, and a second input signal that depends upon a current present in the switch element, said switch control circuit being configured to generate an internal signal, indicating a comparison between the second input signal and the comparison signal, and generate the command signal as a function of the internal signal and of the first control signal.

4. The control module according to claim 1, wherein the estimator stage comprises:
a current generator coupled between a first reference potential terminal and an output node of the estimator stage;
a first switch coupled between the current generator and the output node;
a capacitor coupled between the output node and a second reference potential terminal; and
a series circuit including a resistor and a second switch, said series circuit being coupled between the output node and the second reference potential terminal;
wherein said first and second switches are configured to be controlled based on the first control signal and the command signal.

5. The control module according to claim 4, comprising a reference stage, which includes the estimator stage and is configured to receive a second control signal that is a function of the output electric quantity and of an electrical reference quantity, said reference stage being configured to generate a comparison signal that depends upon the second control signal and is proportional to said input electric quantity; said switch control circuit being further configured to generate the command signal based on the comparison signal, wherein the current generator is of a variable type and is configured to generate a current that depends upon the second control signal.

6. The control module according to claim 4, comprising a logic circuit configured to produce a third control signal based on the first control signal and the command signal, the third control signal indicating a time interval in which said inductor element demagnetizes; the logic circuit being configured to use the third control signal to close the first switch during the time interval in which said inductor element demagnetizes; and wherein the switch control circuit is configured to use the command signal to close the second switch during a time interval in which said switch element is in conduction, and open the second switch while the switch element is not in conduction.

7. The control module according to claim 4, comprising:
a zero-crossing detector configured to receive a first input signal, indicative of a current through the inductor element, and produce the first control signal based on a comparison of the first input signal with a threshold indicative of zero current or close to zero current; and
a logic circuit configured to produce a third control signal based on the first control signal and the command signal, the third control signal indicating a time interval in which said inductor element demagnetizes; the logic circuit being configured to use the third control signal to close the first switch during a time interval in which said inductor element demagnetizes, and open the first switch otherwise; and wherein the logic circuit is configured to use the command signal to close the second switch is closed during a time interval in which said inductor element is at least partially magnetized, and open the second switch during the time interval in which said inductor element is demagnetized.

8. The control module according to claim 4, comprising:
a zero-crossing detector configured to receive a first input signal, indicative of a current through the inductor element, and produce the first control signal based on a comparison of the first input signal with a threshold indicative of zero current or close to zero current, the logic circuit detector being configured to use the first control signal to close the first switch during a time interval in which said inductor element is at least partially magnetized, and open the first switch during the time interval in which said inductor element is demagnetized; and wherein the switch control circuit is configured to use the command signal to close the second switch during a time interval in which said switch element is in conduction, and open the second switch otherwise.

9. A switching converter configured to generate an output electric quantity starting from an input electric quantity, the switching converter comprising:
an inductor element;
a switch element coupled to the inductor element;
a control module that includes:
a switch control circuit configured to generate a command signal for controlling switching of the switch element; and
an estimator stage configured to generate an estimation signal that estimates said input electric quantity based at least in part on a length of time during which both the command signal indicates that the switch element is switched to a non-conductive state and a first control signal indicates said inductor element is magnetized; said switch control circuit being configured to generate the command signal based on the estimation signal.

10. The switching converter according to claim 9, wherein the control module includes a reference stage, which includes the estimator stage and is configured to receive a second control signal that is a function of the output electric quantity and of an electrical reference quantity, said reference stage being configured to generate a comparison signal that depends upon the second control signal and is proportional to said input electric quantity; said switch control circuit being further configured to generate the command signal based on the comparison signal.

11. The switching converter according to claim 9, wherein the control module includes a zero-crossing detector configured to receive a first input signal, indicative of a current through the inductor element, and produce the first control signal based on a comparison of the first input signal with a threshold indicative of zero current or close to zero current, wherein the switch control circuit is configured to receive the comparison signal, the first control signal, and a second input signal that depends upon a current present in the switch element, said switch control circuit being configured to generate an internal signal, indicating a comparison between the second input signal and the comparison signal, and generate the command signal as a function of the internal signal and of the first control signal.

12. The switching converter according to claim 9, wherein the estimator stage comprises:
a current generator coupled between a first reference potential terminal and an output node of the estimator stage;
a first switch coupled between the current generator and the output node;
a capacitor coupled between the output node and a second reference potential terminal; and
a series circuit including a resistor and a second switch, said series circuit being coupled between the output node and the second reference potential terminal;
wherein said first and second switches are configured to be controlled based on the first control signal and the command signal.

13. The switching converter according to claim 12, wherein the control module includes a logic circuit configured to produce a third control signal based on the first control signal and the command signal, the third control signal indicating a time interval in which said inductor element demagnetizes; the logic circuit being configured to use the third control signal to close the first switch during the time interval in which said inductor element demagnetizes; and wherein the switch control circuit is configured to use the command signal to close the second switch during a time interval in which said switch element is in conduction, and open the second switch while the switch element is not in conduction.

14. The switching converter according to claim 12, wherein the control module includes:
a zero-crossing detector configured to receive a first input signal, indicative of a current through the inductor element, and produce the first control signal based on a comparison of the first input signal with a threshold indicative of zero current or close to zero current; and
a logic circuit configured to produce a third control signal based on the first control signal and the command signal, the third control signal indicating a time interval in which said inductor element demagnetizes; the logic circuit being configured to use the third control signal to close the first switch during a time interval in which said inductor element demagnetizes, and open the first switch otherwise; and wherein the zero crossing is configured to use the command signal to close the second switch is closed during a time interval in which said inductor element is at least partially magnetized, and open the second switch during the time interval in which said inductor element is demagnetized.

15. A lighting system comprising:
a light source
a switching converter coupled to the light source and configured to generate an output electric quantity starting from an input electric quantity, the switching converter including:
an inductor element;
a switch element coupled to the inductor element;
a control module that includes:
a switch control circuit configured to generate a command signal for controlling switching of the switch element; and
an estimator stage configured to generate an estimation signal that estimates said input electric quantity based at least in part on a length of time during which both the command signal indicates that the switch element is switched to a non-conductive state and a first control signal indicates said inductor element is magnetized; said switch control circuit being configured to generate the command signal based on the estimation signal.

16. The lighting system according to claim 15, wherein the control module includes a reference stage, which includes the estimator stage and is configured to receive a second control signal that is a function of the output electric quantity and of an electrical reference quantity, said reference stage being configured to generate a comparison signal that depends upon the second control signal and is proportional to said input electric quantity; said switch control circuit being further configured to generate the command signal based on the comparison signal.

17. The lighting system according to claim 16, wherein the control module includes a zero-crossing detector configured to receive a first input signal, indicative of a current through the inductor element, and produce the first control signal based on a comparison of the first input signal with a threshold indicative of zero current or close to zero current, wherein the switch control circuit is configured to receive the comparison signal, the first control signal, and a second input signal that depends upon a current present in the switch element, said switch control circuit being configured to generate an internal signal, indicating a comparison between the second input signal and the comparison signal, and generate the command signal as a function of the internal signal and of the first control signal.

18. The lighting system according to claim 15, wherein the estimator stage comprises:
a current generator coupled between a first reference potential terminal and an output node of the estimator stage;
a first switch coupled between the current generator and the output node;
a capacitor coupled between the output node and a second reference potential terminal;
a series circuit including a resistor and a second switch, said series circuit being coupled between the output node and the second reference potential terminal; and
a logic circuit configured to control said first and second switches based on the first control signal and of the command signal.

19. The lighting system according to claim 18, wherein the control module includes:
a zero-crossing detector configured to receive a first input signal, indicative of a current through the inductor element, and produce the first control signal based on a comparison of the first input signal with a threshold indicative of zero current or close to zero current, the logic circuit being configured to use the first control signal to close the first switch during a time interval in which said inductor element is at least partially magnetized, and open the first switch during the time interval in which said inductor element is demagnetized; and wherein the switch control circuit is configured to use the command signal to close the second switch during a time interval in which said switch element is in conduction, and open the second switch otherwise.

20. A method for controlling a switching converter, which includes a inductor element and a switch element and is configured to generate an output electric quantity starting from an input electric quantity, said method comprising:
generating a command signal that controls switching of the switch element; and
generating an estimation signal, that estimates said input electric quantity, based at least in part on a length of time during which both the command signal indicates that the switch element is switched to a non-conductive state and a first control signal indicates said inductor element is magnetized; wherein generating the command signal comprises generating the command signal based on the estimation signal.

21. The control method according to claim 20, further comprising:
generating a comparison signal, proportional to said input electric quantity, based on a second control signal, which is a function of the output electric quantity, and based on an electrical reference quantity; and
generating the command signal based on the comparison signal.

22. The control method according to claim 21, further comprising:
producing the first control signal based on a comparison of a first input signal, indicative of a current through the inductor element, with a threshold indicative of zero current or close to zero current;
generating an internal signal indicating a comparison between the comparison signal and a second input signal that depends upon a current present in the switch element; and
generating the command signal based on the internal signal and the first control signal.

23. The control method according to claim 20, wherein said generating an estimation signal comprises alternating steps of charge and steps of discharge of a capacitor, based on the first control signal and the command signal.

24. The control method according to claim 23, comprising:
generating a comparison signal, proportional to said input electric quantity, based on a second control signal, which is a function of the output electric quantity, and based on an electrical reference quantity; and
generating the command signal based on the comparison signal wherein said charging steps comprise injecting into the capacitor a current that varies as a function of the second control signal.

25. A method, comprising:
generating an estimation signal that estimates an input electric quantity of a switching converter, which includes an inductor element and a switch element and is configured to generate an output electric quantity starting from the input electric quantity, said generating including generating said estimation signal based at least in part on a length of time during which both a command signal, which controls the switching of the switch element, indicates that the switch element is switched to a non-conductive state and a signal indicate said inductor element is demagnetized.

26. The method of claim 25, further comprising:
generating a comparison signal, proportional to the input electric quantity based on a first control signal, which is a function of an output electric quantity of the switching converter and based on an electrical reference quantity; and
generating the command signal based on the comparison signal.

27. The method of claim 25, wherein generating the estimation signal includes:
alternating charging and discharging a capacitor based on the signal and the command signal.

28. A control module for controlling a switching converter, which includes an inductor element and a switch element and is configured to generate an output electric quantity starting from an input electric quantity, said control module comprising:
a switch control circuit configured to generate a command signal for controlling switching of the switch element; and
an estimator stage configured to generate an estimation signal proportional to said input electric quantity, based on the command signal and a first control signal indicating a time interval in which said inductor element is demagnetized; said switch control circuit being configured to generate the command signal based on the estimation signal, wherein the estimator stage includes:
a current generator coupled between a first reference potential terminal and an output node of the estimator stage;
a first switch coupled between the current generator and the output node;
a capacitor coupled between the output node and a second reference potential terminal; and
a series circuit including a resistor and a second switch, said series circuit being coupled between the output node and the second reference potential terminal;
wherein said first and second switches are configured to be controlled based on the first control signal and the command signal.

29. The control module according to claim 28, comprising a reference stage, which includes the estimator stage and is configured to receive a second control signal that is a function of the output electric quantity and of an electrical reference quantity, said reference stage being configured to generate a comparison signal that depends upon the second control signal and is proportional to said input electric quantity; said switch control circuit being further configured to generate the command signal based on the comparison signal.

30. The control module according to claim 28, comprising a reference stage, which includes the estimator stage and is configured to receive a second control signal that is a function of the output electric quantity and of an electrical reference quantity, said reference stage being configured to generate a comparison signal that depends upon the second control signal and is proportional to said input electric quantity; said switch control circuit being further configured to generate the command signal based on the comparison signal, wherein the current generator is of a variable type and is configured to generate a current that depends upon the second control signal.

* * * * *